Figure 1:
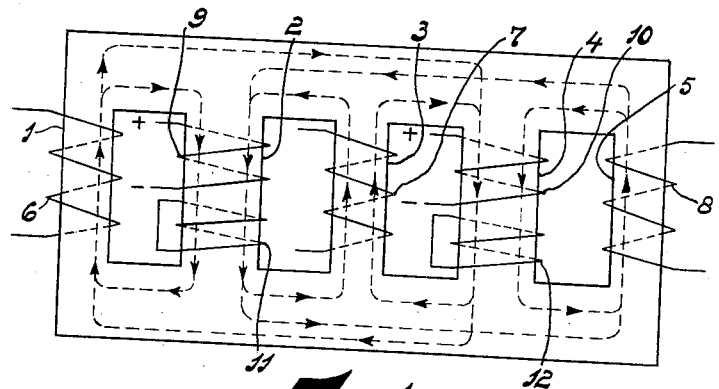

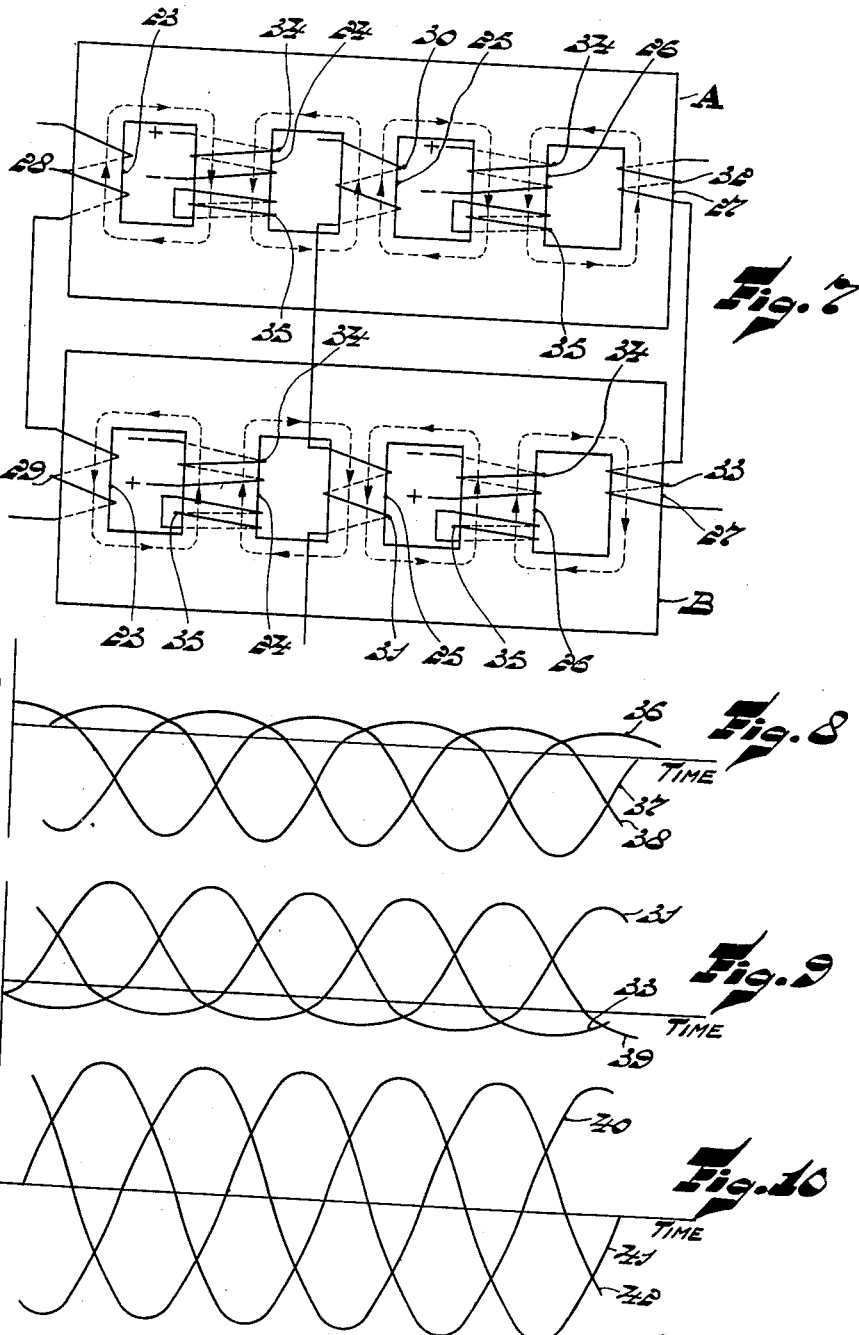

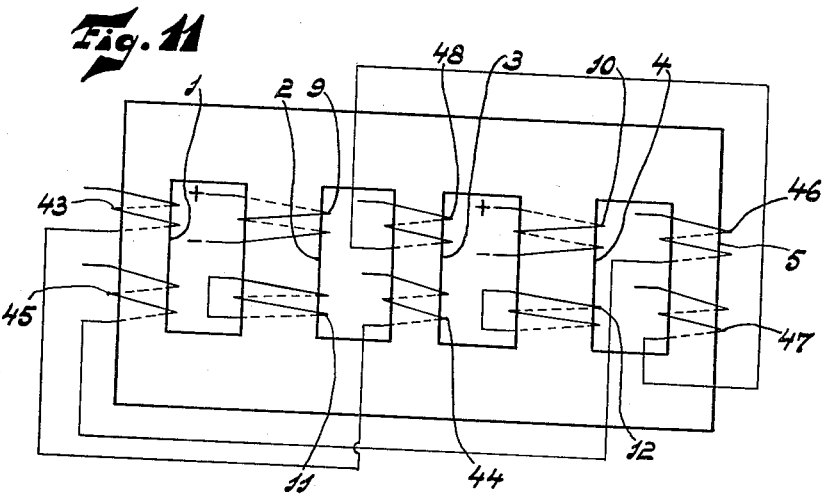
Fig. 11
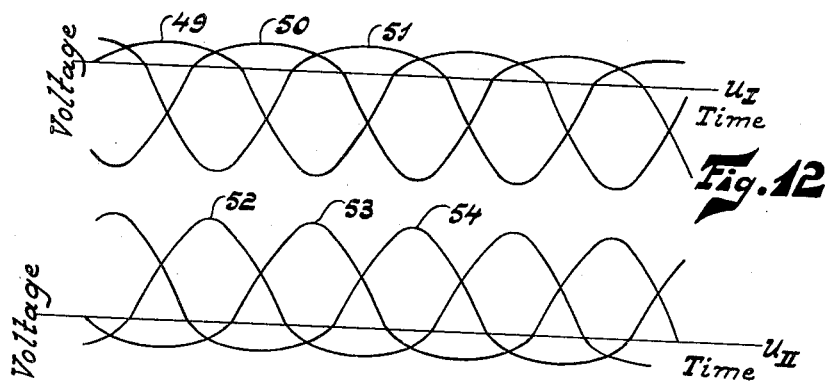
Fig. 12
Fig. 13
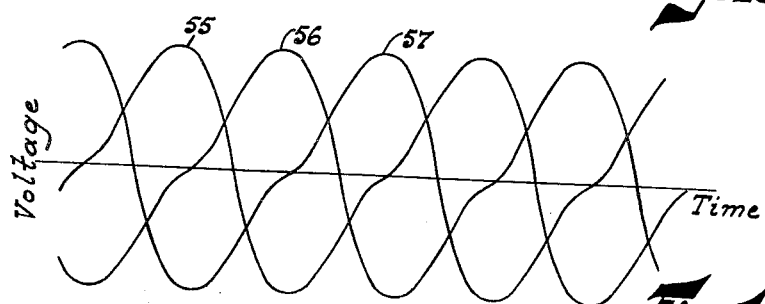
Fig. 14

Patented Aug. 27, 1940

2,212,543

UNITED STATES PATENT OFFICE 2,212,543

POLYPHASE CHOKE COIL

Richard Klaus Jovy, Berlin, Karlshorst, Germany, assignor, by mesne assignments, to Hartford National Bank and Trust Company, Hartford, Conn., as trustee Application June 19, 1939, Serial No. 279,964
In Germany June 20, 1938

8 Claims. (Cl. 171—242)

My invention relates to polyphase, particularly three-phase, choke coils for controlling the energy control of alternating current loads by means of direct current superposed magnetization. In such chokes, two methods are used to prevent electromotive forces of the supply frequency and odd multiples thereof in the direct current superposed magnetization winding. First a direct current superposed magnetization winding may be placed on each outer leg of a three-legged core and an alternating current winding proper placed on the central leg of the two direct current windings so connected in series with each other that the electromotive forces of the supply frequency in them are prevented. Alternatively, the alternating current windings may be placed on the outer legs and the direct current superposed magnetization winding placed on the central leg so that the magnetic fluxes produced in the central leg by the two outer legs are oppositely directed and the flux harmonics of the supply frequency and odd multiples thereof neutralise each other. Secondly, it is known to group on one core, three choke coils formed in the manner described above, it being possible to unite each pair of direct current windings on a leg so that a seven-legged choke coil is required.

According to the invention, I use, with $m$-phase loads, a choke coil having $2m-1$ legs, i. e. $m$ legs which carry alternating current windings and $m-1$ legs which carry direct current magnetization windings. To control the energy of a three-phase load for example, I use a five-legged choke coil which is so constructed that the alternating current windings are arranged on the central leg and on the two extreme legs and the direct current superposed magnetization windings are distributed about the two legs which are intermediate the legs that carry the alternating current windings. In such a construction, the occurrence of electromotive forces of supply frequency, and even multiples thereof, in the direct current superposed magnetization windings are prevented by purely magnetical coupling. However, in the single-phase choke coil, the influence of the magnetic flux brought about by the alternating current on the leg that carries the direct current superposed magnetization winding is compensated by division of the choke coil alternating current winding into two partial windings acting in opposite senses, and the fundamental wave and the even upper waves are compensated with the five-legged choke coil by magnetic coupling of all the three-phases on a single core. Since, as is well known, the sum of the three-phase-voltages is zero at any moment, a perfect equilibrium is thus obtained without the need for dividing each of the alternating current windings into two partial windings.

In the direct current superposed magnetization windings only harmonic electromotive forces of odd order number can occur which, particularly with a load which derives greatly distorted currents from the supply circuit, for example with a rectifier, may assume a substantial value. According to the invention, I remove these upper waves of odd order number by providing a supplementary short-circuited winding on the leg which carries the D. C. superposed magnetization winding.

Figure 2:
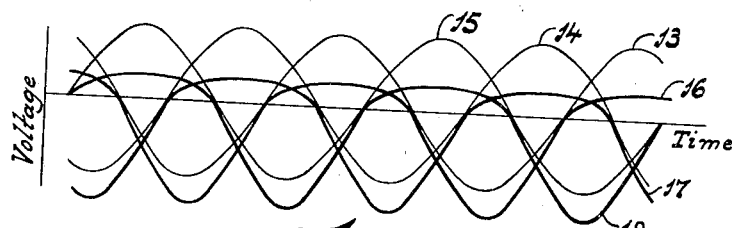

In order that the invention may be clearly understood and readily carried into effect, I shall describe the same in more detail with reference to the accompanying drawings in which:

Figure 1 is a schematic diagram of a three-phase choke coil according to the invention, Fig. 2 is a voltage-time graph for use in connection with Figure 1, Figs. 3, 4, 5 and 6 are current-time graphs for use in connection with Fig. 1, Fig. 7 is a schematic diagram of a choke coil according to another embodiment of the invention, Figs. 8, 9 and 10 are voltage-time graphs for use in connection with Fig. 7, Fig. 11 is a schematic diagram of a choke coil according to another embodiment of the invention, and Figs. 12, 13 and 14 are voltage-time graphs for use in connection with Fig. 11.

The choke coil illustrated in Figure 1, which may be used to control the energy of a three-phase load, comprises an iron core having five legs indicated by reference numerals 1 to 5 inclusive, three alternating current windings 6, 7 and 8 arranged on legs 1, 3 and 5 respectively, two direct current windings 9 and 10 arranged on legs 2 and 4 respectively, and two short-circuited windings 11 and 12 arranged on legs 2 and 4 respectively.

The direct current windings 9 and 10 may be connected in either series and parallel to a suitable supply of direct voltage (not shown) to give their ends the polarity indicated.

The sum of the core cross-sectional areas of the legs carrying the superposed windings should be equal to the sum of the core cross-sectional areas of the legs carrying the alternating current windings i. e. the sum of the cross-sectional areas of legs 2 and 4 are made equal to the sum of the cross-sectional areas of the legs 1, 3 and 5. Thus, in the three-phase construction illustrated the ratio of the cross-sectional area of each of the legs 1, 3 and 5 to that of the legs 2 and 4 should be 2 to 3. With such dimensioning of the legs, ⅓ of the total magnetic flux produced by the direct current windings 9 and 10 will pass through each of the legs 1, 3 and 5. The paths of the flux produced by the direct current windings 9 and 10 are indicated in Figure 1 by dash lines.

Figure 2 shows the variation in voltage across windings 6, 7 and 8 both with and without the superposed magnetization. More particularly, curves 13, 14 and 15 are the voltage curves for windings 6, 7 and 8 respectively without the superposed magnetization produced by the direct current windings 9 and 10, and curves 16, 17 and 18 are the voltage curves of these windings with the superposed magnetization.

Figure 3:
Figure 4:
Figure 5:
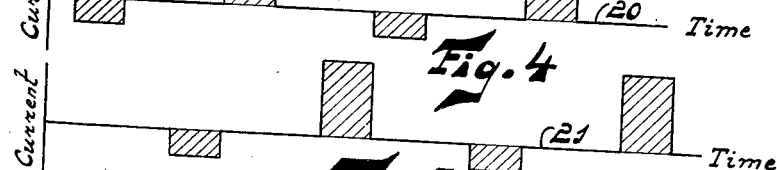
Figure 6:
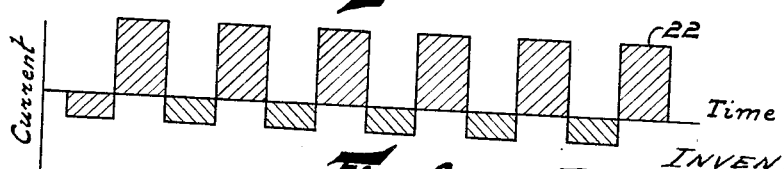

The three curves 19, 20 and 21 of Figures 3, 4 and 5 show the phase current of windings 6, 7 and 8 respectively of Figure 1 when the choke is used, for example, in the supply of a six-phase rectifier (not shown). The curve 22 of Figure 6, which is the summation curve of curves 19, 20 and 21 of Figures 3, 4 and 5, shows that the sum of the three phase-currents produces a magnetic flux of three-fold frequency in the legs 2 and 4 which carry the direct current windings 9 and 10. This flux is compensated by the short-circuited windings 11 and 12 (see Fig. 1) so that interfering voltages will no longer occur at the direct current superposed magnetizing windings.

A choke coil such as shown in Figure 1 has the disadvantage that it offers an asymmetrical resistance in the case of direct current superposed magnetization and thus can not be used for example in the supply of a six-phase rectifier. More particularly, in the case of increasing direct current superposed magnetization, for instance, the voltages of the odd numbered phases would be intensified and the voltages of the even numbered phases would be weakened with the result that when the control of the rectifier is adjusted for a greater energy, the rectifier would operate with only three anodes.

The above disadvantage may be overcome by using two choke coils A and B, such as shown in Figure 7, which have similar cores each having five legs 23, 24, 25, 26 and 27 whose cross-sectional areas are dimensioned in the same manner as the legs of the core of Figure 1. In Fig. 7 each of the alternating current windings comprises a coil on each of the two cores and connected in series with the load. More particularly, the three alternating current windings are formed by the three pairs of series-connected coils 28—29, 30—31 and 32—33 respectively. Each of the legs 24 and 26 is provided with a direct current winding 34 and a short-circuited winding 35. It should be noted that the direct current windings of the chokes A and B are connected in opposite senses, as indicated by the polarity signs and by the dash lines showing paths of the resulting flux, so that the positive half-waves in the choke coil A and the negative half-waves in the choke coil B will be weakened. This is illustrated by Figures 8 and 9 in which curves 36, 37 and 38 are the voltage curves of coils 28, 30 and 32 respectively and the curves 39, 40 and 41 are the voltage curves of the coils 29, 31 and 33 respectively. In this case the load is supplied with a voltage which is equal to the network voltage minus the sum of the two coke coil voltages given in Figures 8 and 9. As a result the load voltage is completely symmetrical three-phase voltage as indicated by curves 40, 41 and 42 in Figure 10 which curves are the summation curves of curves 36—31, 37—33 and 38—39 respectively.

The choke coil shown in Figure 11 has the same core as the choke coil of Figure 1 and similar reference numerals are used. It also has the same direct current windings 9 and 10 and short-circuited windings 11 and 12. However, in Figure 11 each of the alternating current windings is split up into two coils which are arranged on different legs. More particularly, one alternating current winding comprises series-connected coils 43 and 44 arranged on legs 1 and 3 respectively, the second alternating current winding comprises two series-connected coils 45 and 46 arranged on legs 1 and 5 respectively, and the third alternating current winding comprises two series-connected coils 47 and 48 arranged on legs 5 and 3 respectively. Because of this zigzag arrangements of coils 43 to 48, one half-wave is weakened and the other half-wave is intensified for each leg with the result that a symmetrical voltage is set up.

The curves of Figs. 12 and 13 show the partial voltages across the coils of the alternating current windings of Figure 11 which are displaced 120 electrical degrees with respect to each other. More particularly, the curves 49, 50 and 51 of Fig. 12 indicate the voltage across coils 43, 48 and 46 respectively of Fig. 11, and curves 52, 53 and 54 of Fig. 13 indicate the voltages across coils 45, 44 and 47 respectively of Fig. 11. It will be noted that the positive half-waves of curves 49, 50 and 51 are weakened, whereas the negative half-waves of curves 52, 53 and 54 are weakened.

Figure 14 gives the summation curves 55, 56 and 57. More particularly, curve 55 is the sum of curves 49 and 52, curve 56 is the sum of curves 50 and 53 and curve 57 is the sum of curves 51 and 54.

When the direct current superposed magnetization produced by coils 9 and 10 (see Fig. 11) is increased, the positive half-waves will be located in a substantially mirror-image manner with respect to the negative half waves. Consequently if the choke is used, for example, to control the energy of a six-phase rectifier, all the phases will take equal parts of the supply current, but with increasing direct current superposed magnetization of the choke coil, the rectifier will operate with a three-phase ripple instead of a six-phase ripple.

While I have described my invention in connection with certain examples and application, I do not wish to be limited thereto because obvious modifications will present themselves to those skilled in the art.

What I claim is:

1. A polyphase choke coil for controlling energy of an alternating current load comprising a core having a plurality of legs equal to twice the number of phases minus one, a plurality of alternating current windings equal to the number of phases, and a plurality of direct current superposed magnetization windings equal to the number of phases minus one, each of said windings being arranged on one of said legs.

2. A choke coil for controlling the energy of a three-phase load comprising a core having five legs, an alternating current winding on the central leg, two alternating current windings, one on each outer leg, and two direct current superposed magnetization windings, one on each of two remaining legs.

3. A polyphase choke coil for controlling the energy of an alternating current load comprising a core having a plurality of legs equal to twice the number of phases minus one, a plurality of alternating current windings equal to the number of phases, a plurality of direct current superposed magnetization windings equal to the number of phases minus one, each of said windings being arranged on one of said legs, and a short-circuited winding on each of the legs carrying a direct current winding.

4. A polyphase choke coil for controlling the energy of an alternating current load comprising a core having a plurality of legs equal to twice the number of phases minus one, a plurality of alternating current windings equal to the number of phases and each having a plurality of coils, and a plurality of direct current superposed magnetization windings equal to the number of phases minus one, each of said direct current windings being arranged on one of said legs and the alternating current windings being arranged on the remaining legs with the coils of each winding on separate legs.

5. A polyphase choke coil for controlling the energy of an alternating current load comprising a core having a plurality of legs equal to twice the number of phases minus one, a plurality of alternating current windings equal to the number of phases, and a plurality of direct current superposed magnetization windings equal to the number of phases minus one, each of said windings being arranged on one of said legs, the sum of the cross-sectional areas of the legs carrying the alternating current windings being equal to the sum of the cross-sectional area of the legs carrying the direct current windings.

6. A choke coil for controlling the energy of a three-phase load comprising a core having five legs, an alternating current winding on the central leg, two alternating current windings, one on each outer leg, and two direct current superposed magnetization windings, one on each of the two remaining legs, the cross-sectional area of each of the legs carrying an alternating current winding being $2/3$ of the cross-sectional area of each leg carrying a direct current winding.

7. An arrangement for producing symmetrical polyphase alternating current voltages comprising two choke coils each having a core having a plurality of legs equal to twice the number of phases minus one, a plurality of alternating current windings for each core equal to the number of phases and arranged one on a leg, and a plurality of direct current windings for each core equal to the number of phases minus one and arranged one on a leg, the alternating current windings and direct current windings of one core being connected in series in opposite sense with the alternating current windings and direct current windings of the other core.

8. An arrangement for producing symmetrical polyphase alternating current voltages comprising two choke coils each having a core having a plurality of legs equal to twice the number of phases minus one, a plurality of alternating current windings for each core equal to the number of phases and arranged one on a leg, and a plurality of direct current windings for each core equal to the number of phases minus one and arranged one on a leg, the alternating current windings of one core being connected in series in opposite sense with the alternating current windings of the other core and the direct current windings of both cores being connected in series in the same sense.

RICHARD KLAUS JOVY.